July 24, 1962   G. N. WILLIS ETAL   3,045,584
TWINE WRAPPING AND JOINTING MACHINES FOR TYING BUNDLES
Filed Feb. 17, 1959   15 Sheets-Sheet 5
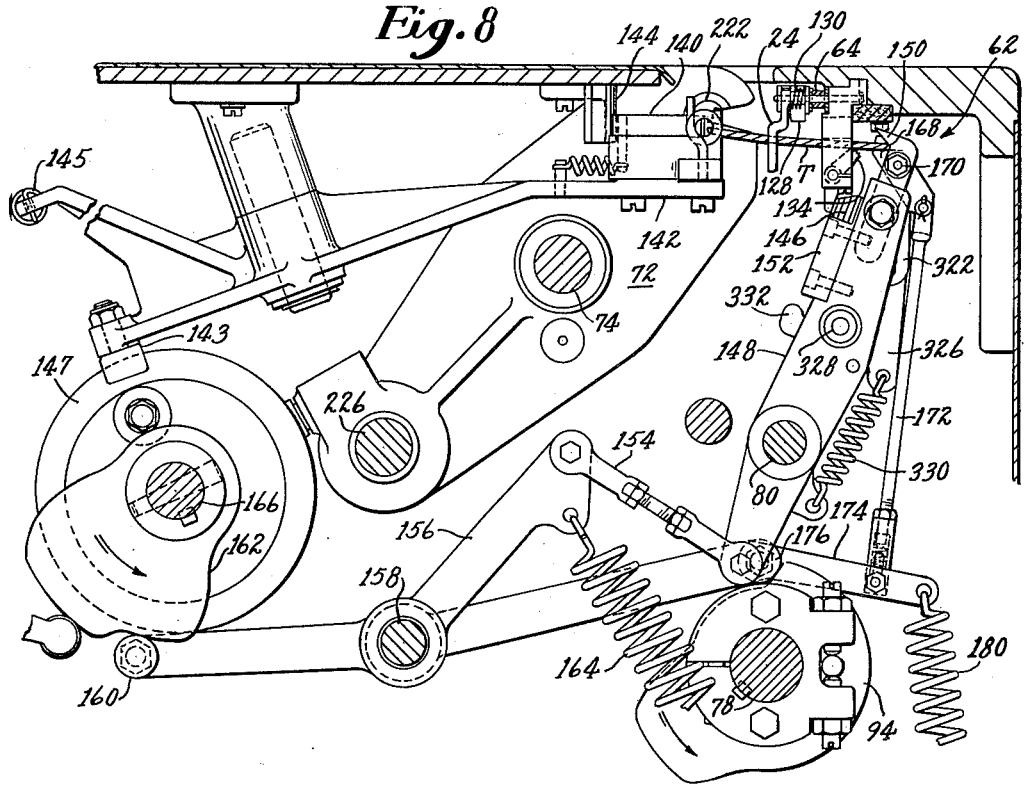
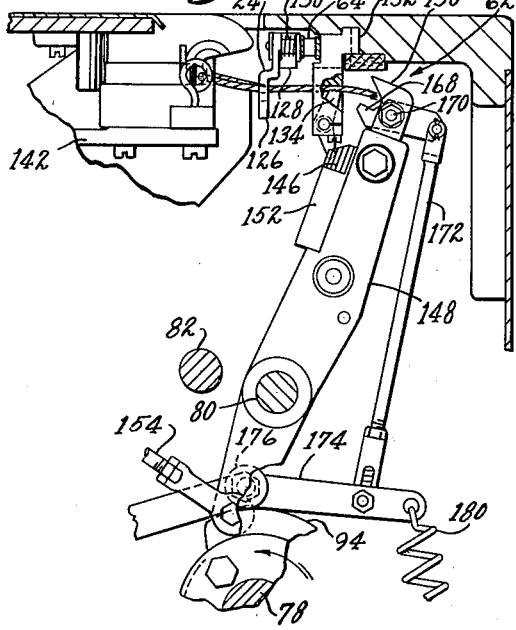
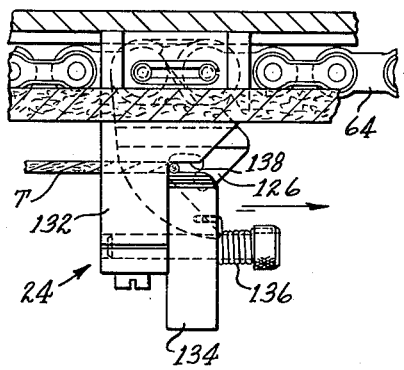

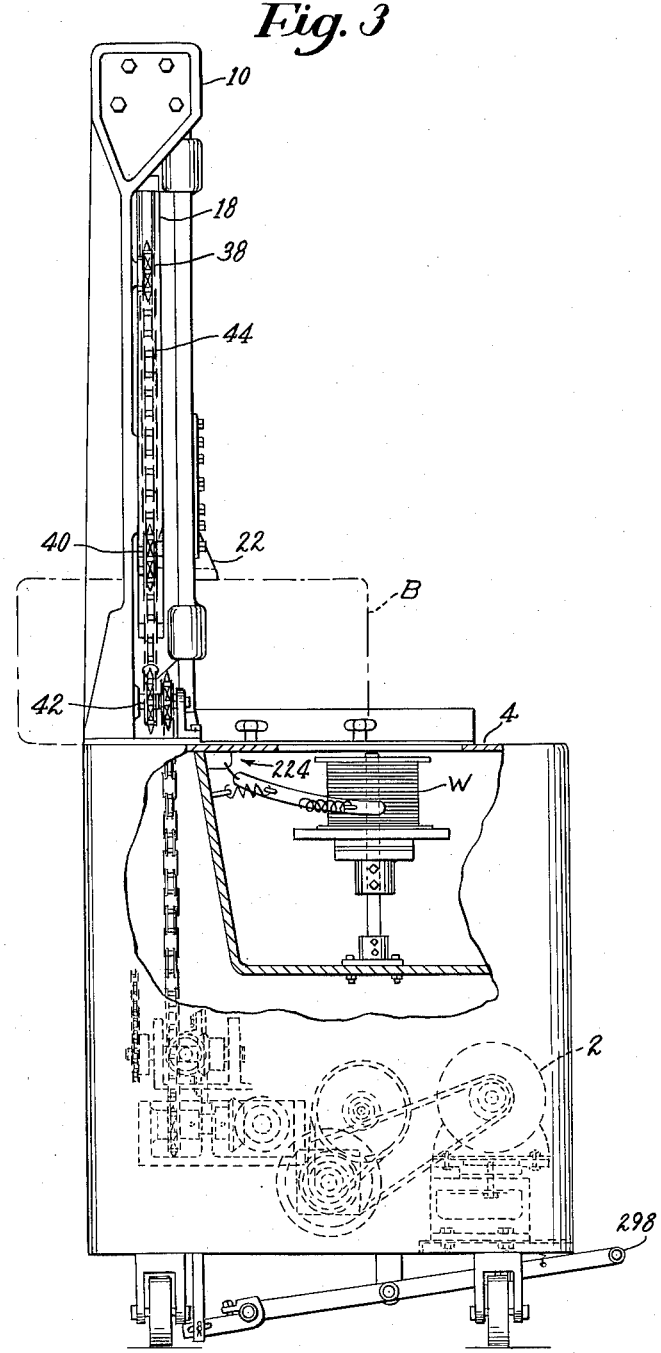

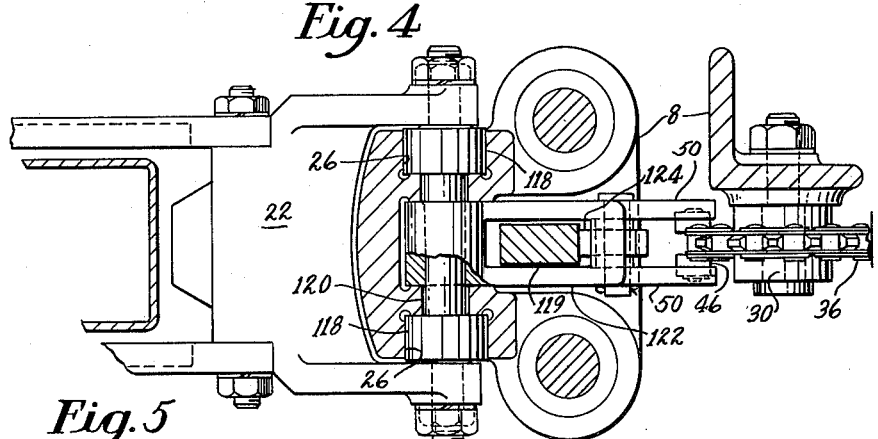
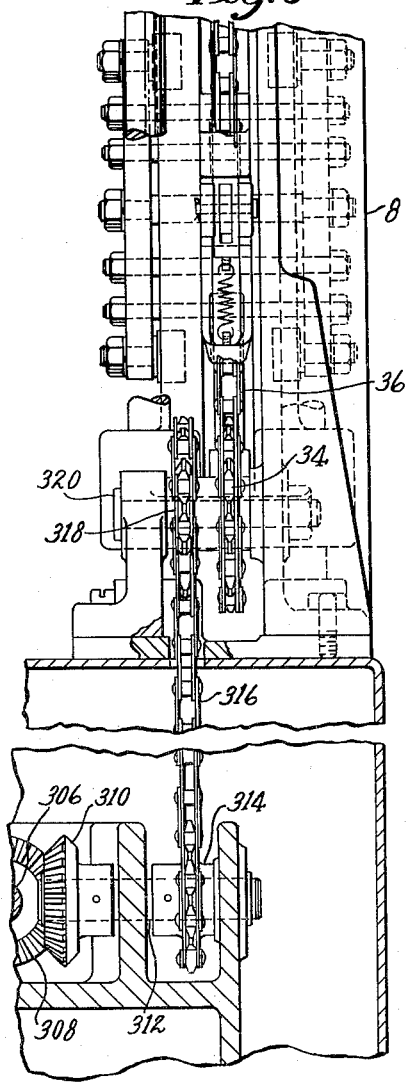
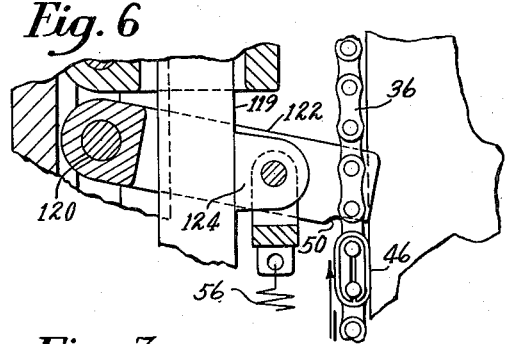
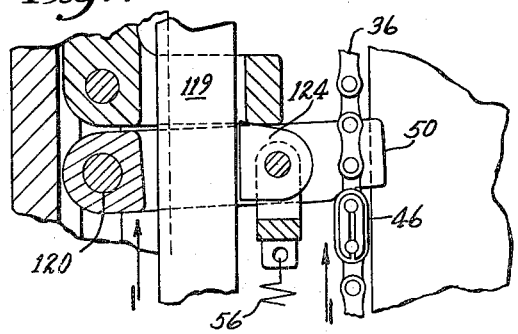

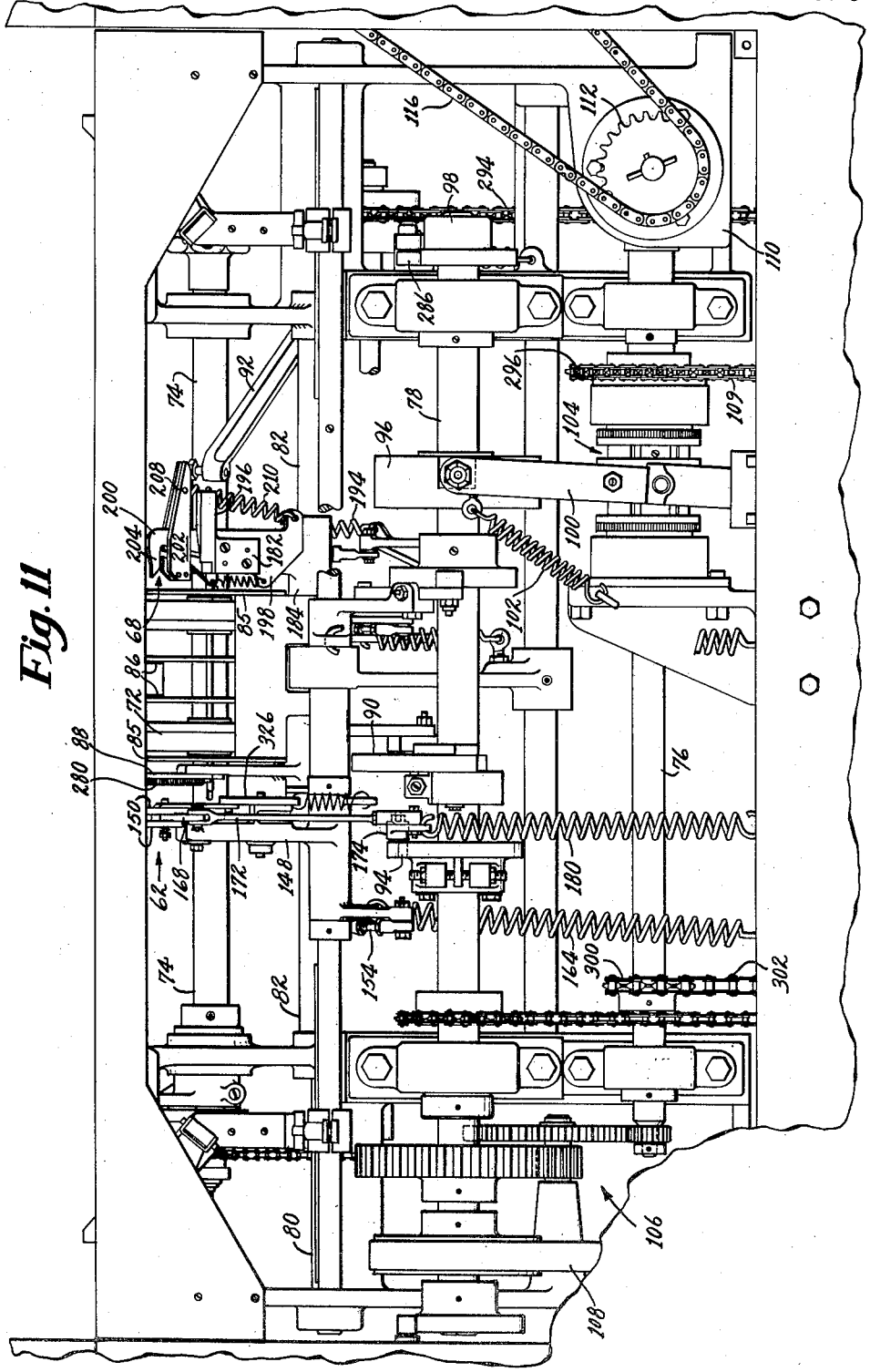

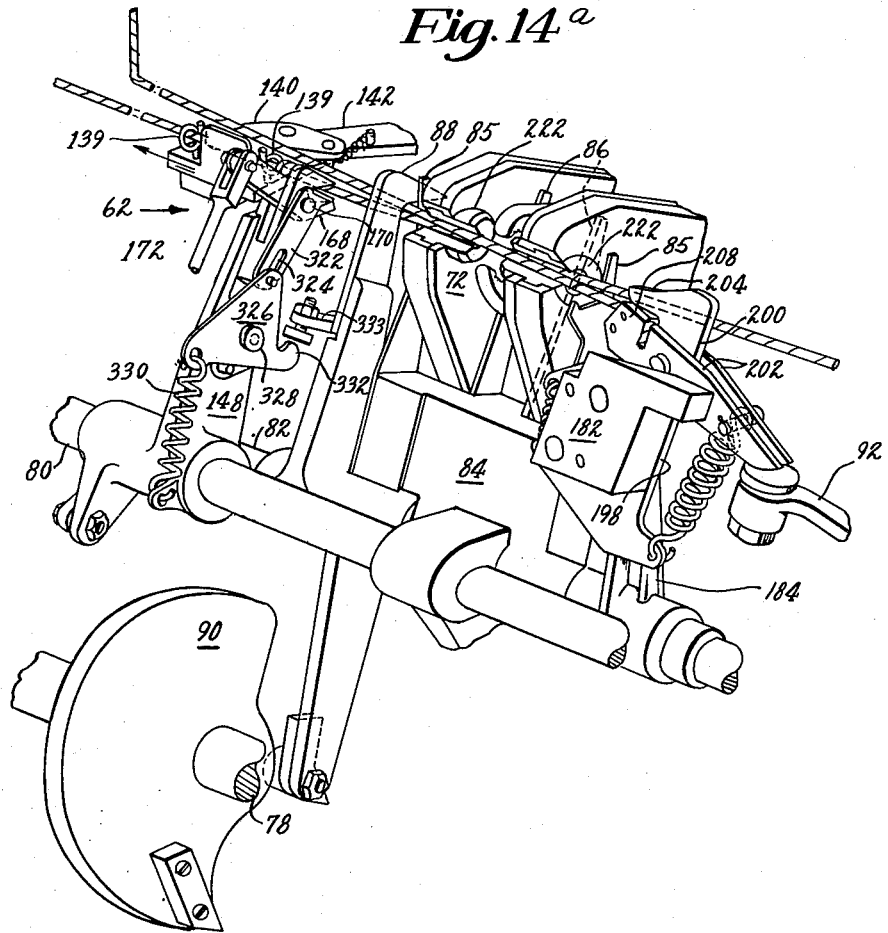
Fig. 14ᵃ
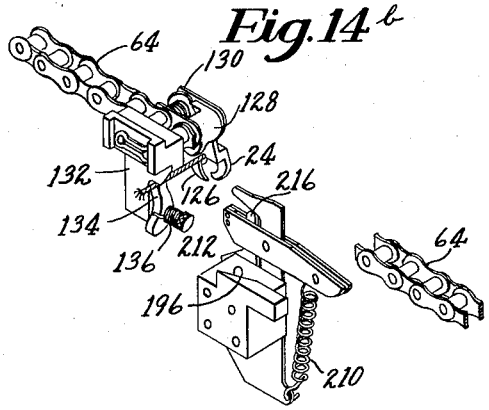
Fig. 14ᵇ

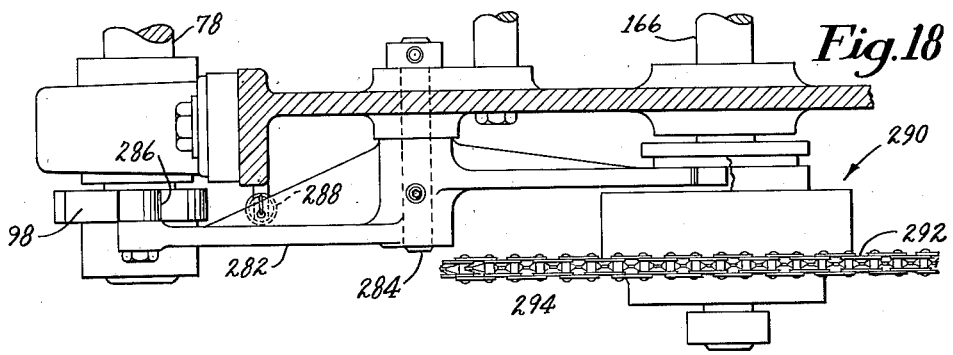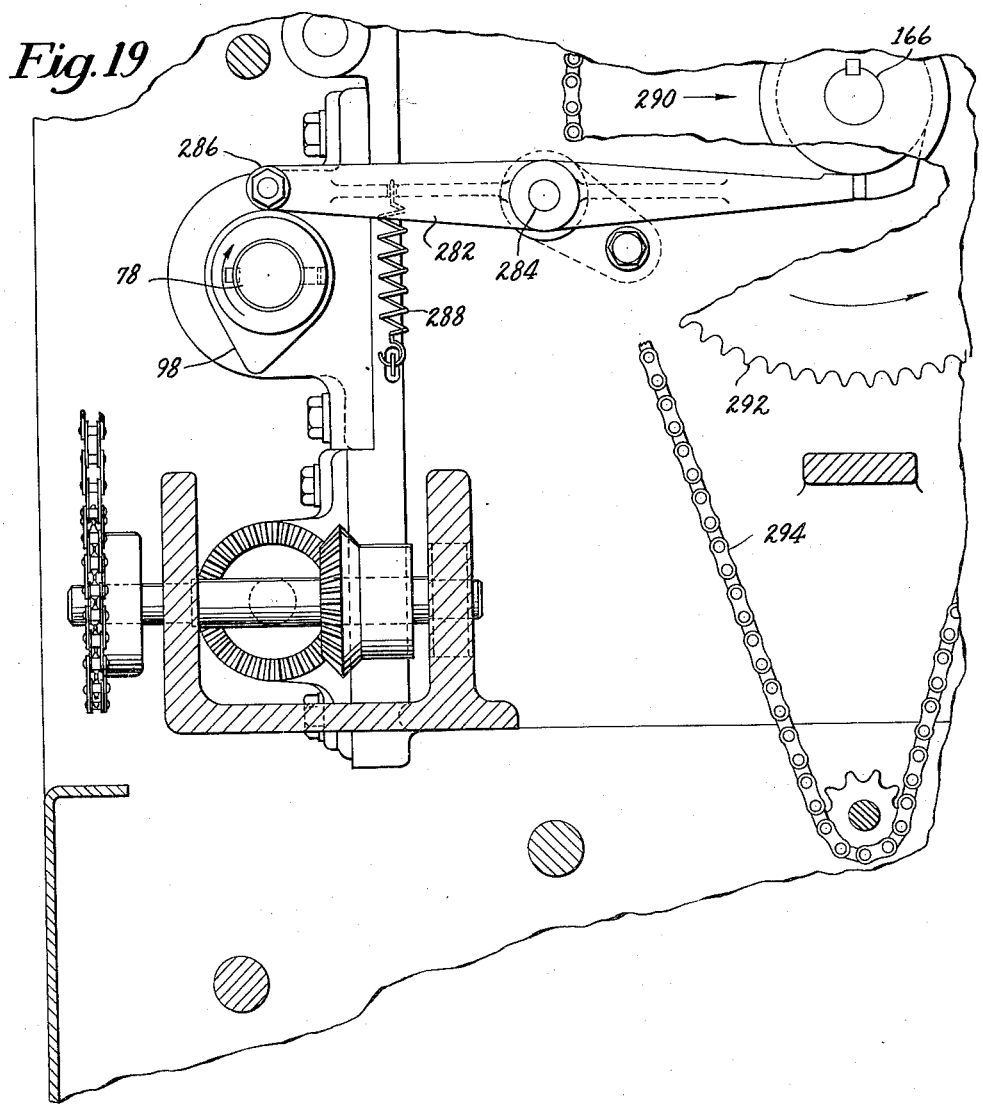

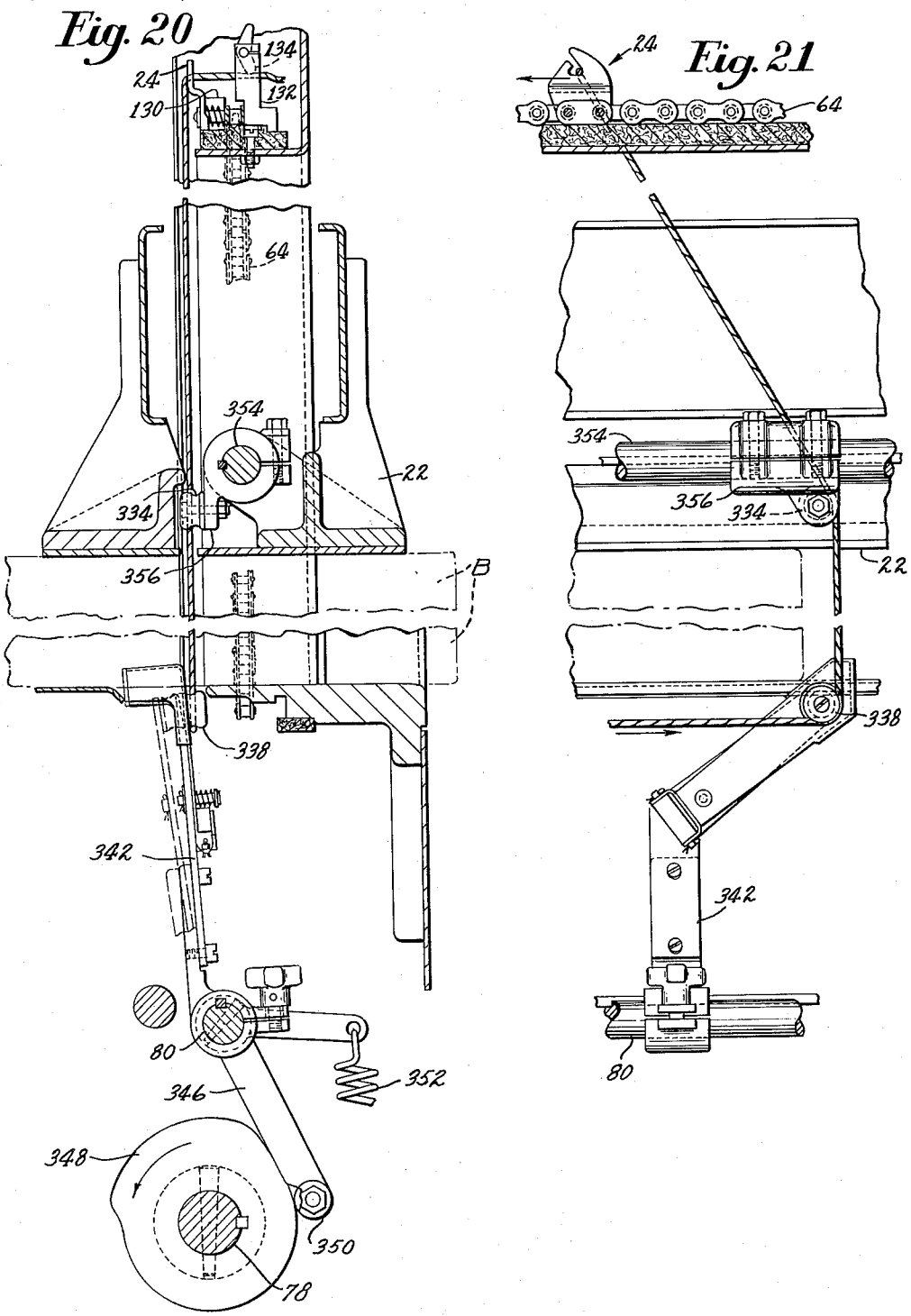

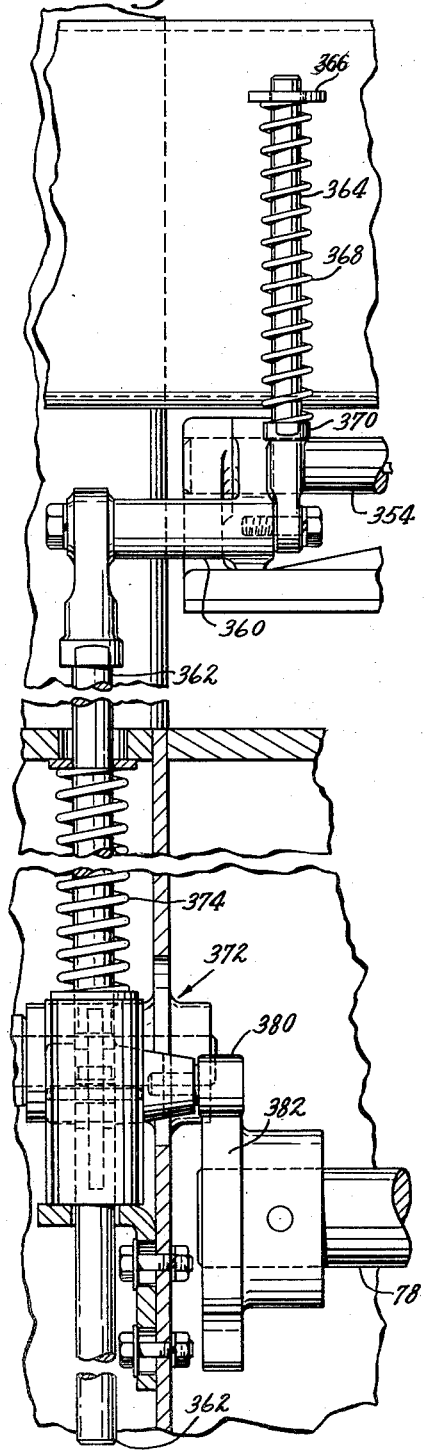
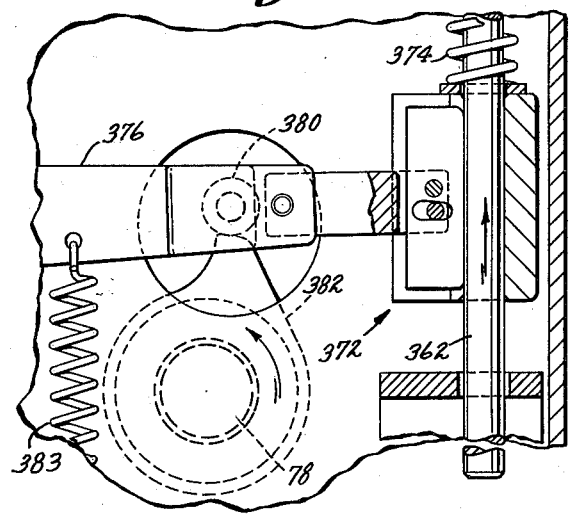
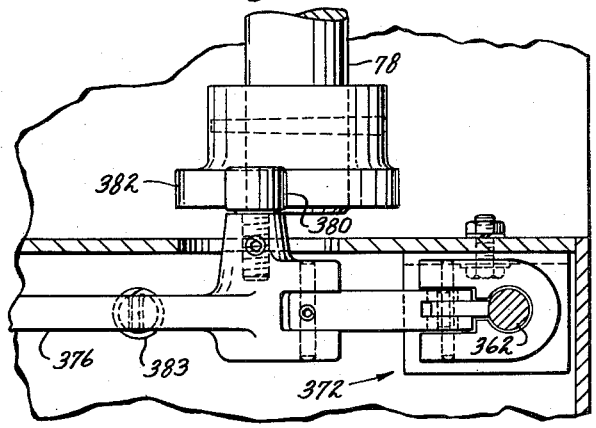

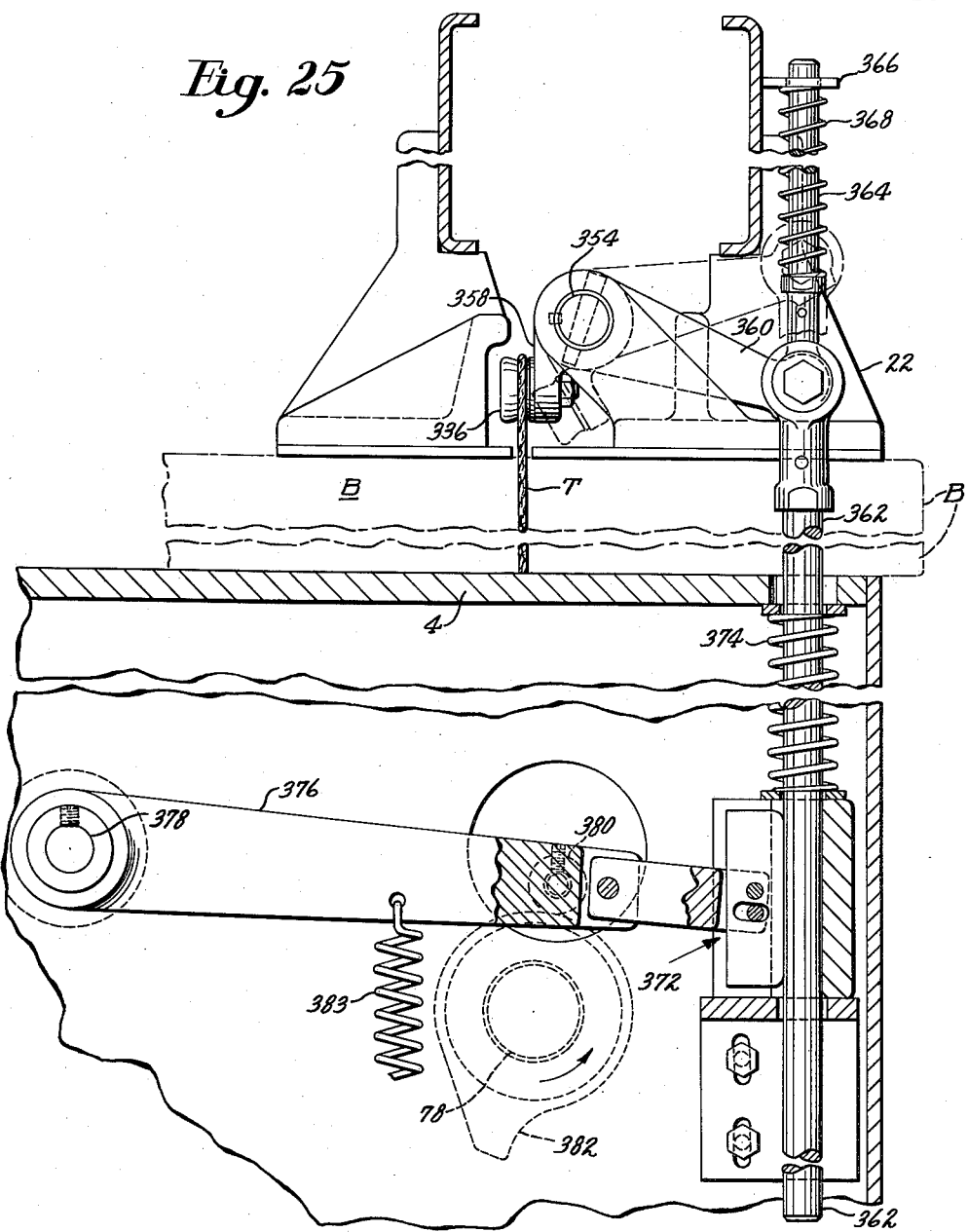

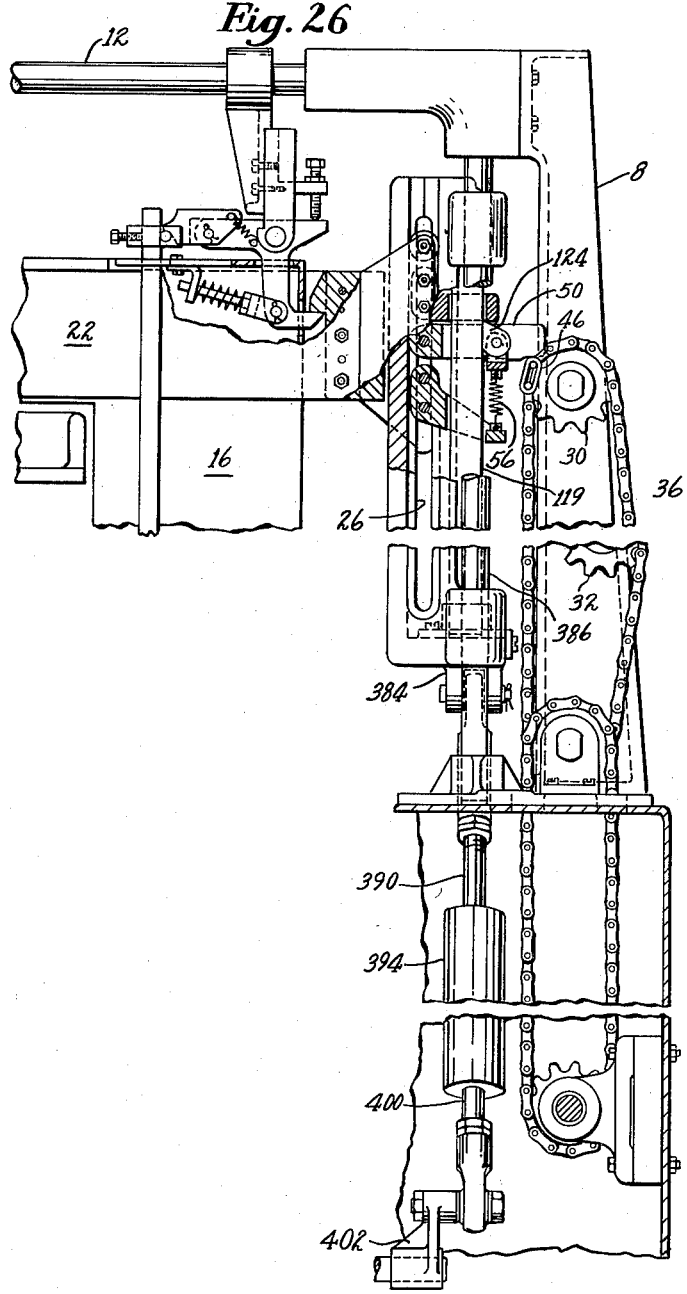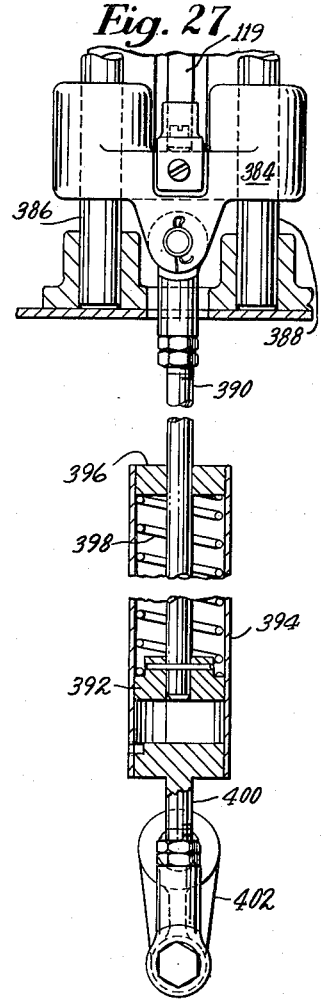

United States Patent Office 3,045,584
Patented July 24, 1962

3,045,584
TWINE WRAPPING AND JOINTING MACHINES FOR TYING BUNDLES
Grant N. Willis and Lionel H. Seccombe, Jr., Bristol, Conn., assignors to United Shoe Machinery Corporation, Flemington, N.J., a corporation of New Jersey
Filed Feb. 17, 1959, Ser. No. 793,913
Claims priority, application Great Britain Feb. 20, 1958
8 Claims. (Cl. 100—27)

This invention is concerned with improvements in or relating to bundle tying machines adapted for use in applying a length of wire or the like around a bundle and for forming a jointure at the end portions of the twine. Such bundle tying machines are extensively used in many trades, and are particularly useful in tying up bundles of newspapers before they are dispatched.

This invention relates in particular to an automatic machine for carrying a length of twine around a bundle that has been prepositioned upon a work supporting surface beneath which surface twine jointing mechanism is adjacently located for applying a jointure, in the form of a tightly drawn length of wire, in helical twists about the overlapping ends of the wrapped length of twine.

The invention is illustrated herein as embodied in a machine having twine jointing mechanism of the type disclosed and claimed in our United States Letters Patent No. 2,765,003, granted October 2, 1956. In the foregoing patent the jointure of wire is applied, to the overlapped ends of the length of twine encircling a bundle, by a pair of wire twisting spindles adjacently mounted to one another and coaxially rotatable in opposite directions. As clearly disclosed in said patent, both of the wire twisting spindles are provided with a radial notch which, when the spindles are at their "at rest" position, is adapted to receive the overlapped portions of the twine so that, upon subsequent spindle rotation, said portions of twine will be disposed at the center of spindle rotation, while the length of wire to be twisted about the twine is accommodated in eccentrically located wire passages formed through each spindle parallel to the axis of spindle rotation.

It is one of the various objects of this invention to provide automatic means for rapidly encircling a bundle with a strong wrapping of twine so that both ends of the encircling twine are disposed in overlapping contiguity with one another.

Another object is to provide means for pressing or compacting the bundle, if desired so to do, before applying the twine wrapping.

A further object is to maintain the twine, as it is being drawn around the bundle, in slightly spaced apart relation therefrom, so that the moving twine will cause no chafing or cutting effect as might be the case if the twine were allowed to be pulled against the corners of the bundle.

Another object is to provide automatic means whereby, after the bundle has been encircled, the twine is allowed to contact the bundle directly, whereupon a tensioning force is then applied to tighten the twine and thus provide a taut binder around the bundle.

It is another of the various objects of the present invention to provide bundle tying mechanism in a machine which incorporates mechanism for forming a jointure substantially as described in our United States Patent No. 2,765,003.

Still another object is to provide means for automatically severing the wrapped length of twine from the remaining twine supply.

A further object of this invention is to provide means for automatically ejecting the jointed wrapping from its engagement with the wire jointing mechanism or spindles, so that the finished bundle may be removed readily from the machine.

The above and other features of the invention, including various novel details of construction and combinations of parts, will now be more particularly described with reference to the accompanying drawings, and pointed out in the claims.

In the drawings,

FIG. 3 is a left side elevation of the machine with a portion broken away;

FIGS. 4, 5, 6 and 7 show details of the presser beam construction, and of the control means for compacting a bundle;

FIGS. 8 and 9 show certain parts of the illustrated machine as viewed during two phases of the machine operation;

FIG. 10 shows constructional details of a twine carrying flyer member;

FIG. 11 is an enlarged rear elevation of some of the operating mechanisms shown in FIG. 2;

FIGS. 12, 13, 14, 14A and 14B show various details of the illustrated machine;

FIGS. 18 and 19 show details of some of the clutch control and driving mechanism;

FIGS. 20 and 21 show details of the twine engaging guard rolls for protecting the corners of a bundle;

FIGS. 22, 23, 24 and 25 show details of the mechanism for actuating the guard rolls; and FIGS. 26 and 27 show details of mechanism for applying a downward compacting force to the beam after the beam has been dropped upon the bundle.

The machine herein illustrated is adapted for use in applying a length of twine tightly around a bundle (for example a bundle of newspapers) and for forming a jointure around the end portions of the twine, which jointure is formed by wrapping wire around the overlapped end portions of the twine substantially as described in our above-mentioned United States Patent No. 2,765,003.

Figure 1:
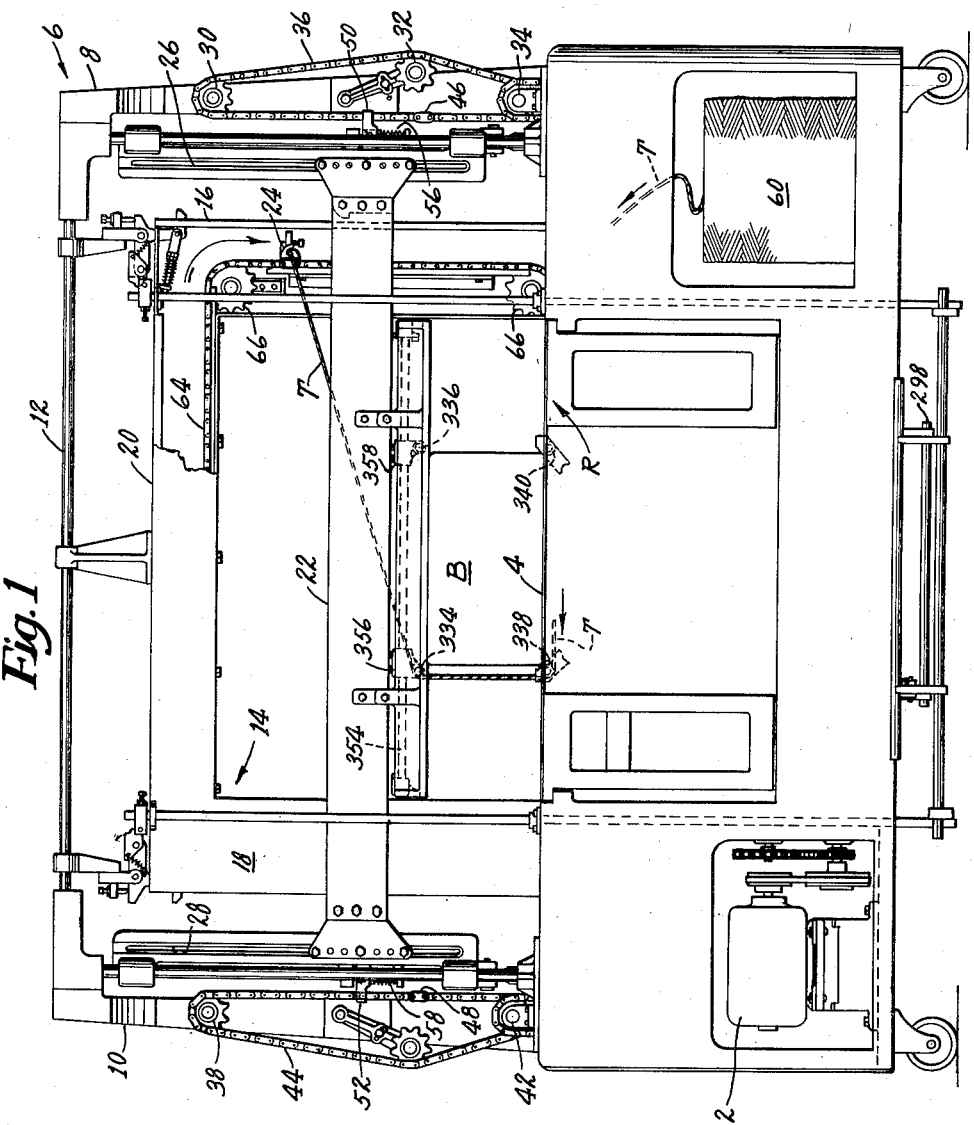
FIG. 1 is a front elevation of the machine of this invention, with certain parts broken away, and as viewed during the twine wrapping phase of operation.
Figure 2:
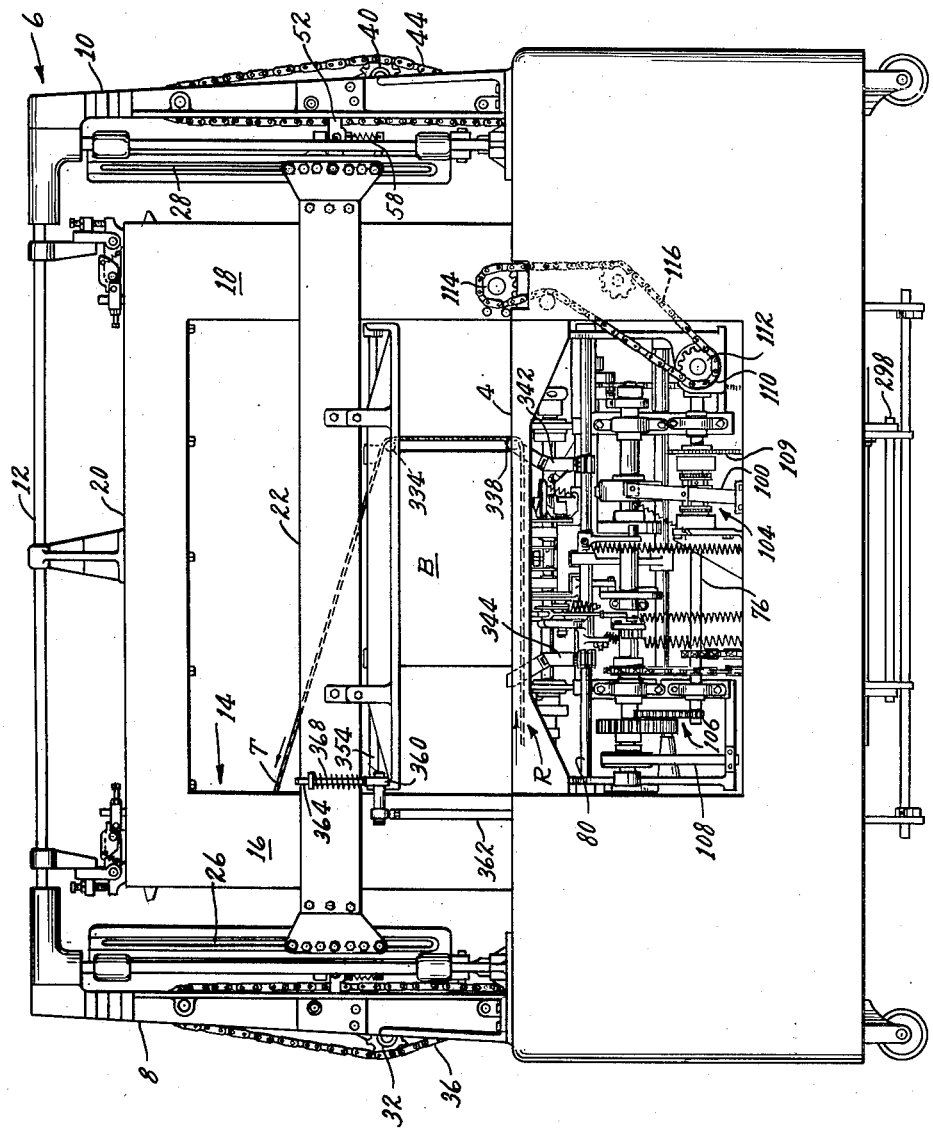
FIG. 2 is a rear elevation of the machine in the same operational phase as illustrated in FIG. 1.
Figure 12:
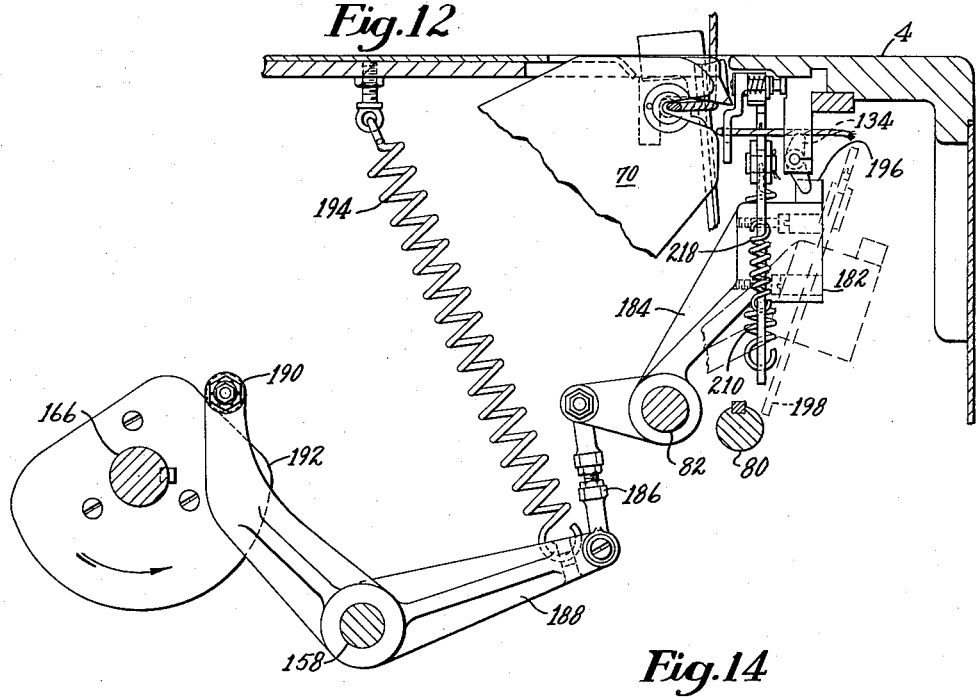
Figure 13:
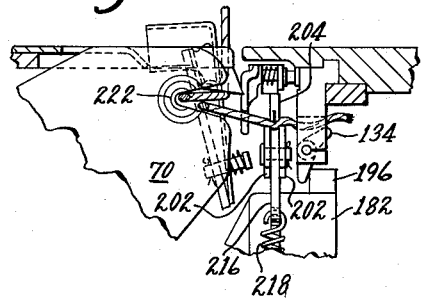
Figure 14:
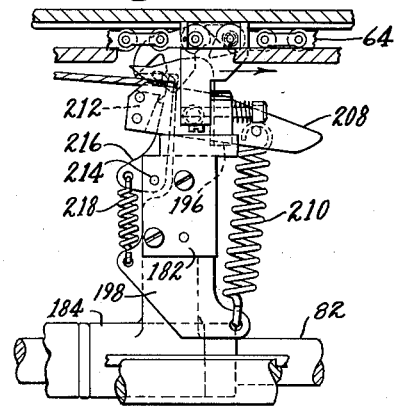

Referring to FIGS. 1 through 3, the machine comprises a machine frame in which are supported a motor 2, mechanism for applying twine around a bundle B positioned on a work table 4, and beneath the work table is mechanism for forming the jointure. Two rigid head frames extend upwardly from the machine frame. The first is an outer head frame designated by the arrow 6. This comprises two outer, vertical, supporting members 8, 10 extending upwards from the frame at opposite sides of the work table and linked at their upper ends by a horizontal tie member 12 which extends across the work table 4. The second is an inner head frame, designated by the arrow 14, which comprises two inner, vertical, posts 16, 18 extending upwards from the frame adjacent opposite sides of the work table 4. The posts 16, 18 are joined at their upper ends by a crossbeam 20 which extends across the work table and below the horizontal tie 12. Both of the head frames 6 and 14 lie in approximately the same plane.

In the operation of the illustrated machine a bundle B is placed on the work table 4 between the two inner posts 16, 18 and beneath a horizontal presser beam 22, which is mounted at its ends for up-and-down sliding movement along guideways of the two supporting members 8, 10. This beam 22 is dropped onto the top of the bundle B to compress it. Twine T is then carried around the bundle B by a flyer member 24 mounted for rectangular movement in and about the inner head frame 14. The twine is next tightened around the bundle B, and a jointure is made by wrapping wire around overlapping end portions of the twine, after which the jointed twine is trimmed off from the supply of twine.

The presser beam 22, in its vertical movement between the supporting members 8 and 10, is guided at both ends by a pair of parallel slide grooves 26, 26 (FIG. 4) in each of which slide grooves run rollers 118 mounted on a shaft 120 affixed to the end of the beam 22. The head frame supporting member 8 also supports a vertical guide rod 119 around which passes a yoke member 122 pivoted on the shaft 120. The member 122 comprises two cam members 50, 50 between which is pivoted a gripping member 124 (FIGS. 6 and 7). A spring 56, acting between the beam 22 and the member 122, urges the member 122 in a clockwise direction about its pivot. While the foregoing description pertaining to the latter figures is in regard to the structure associated with the right-hand side of the beam 22, the other end of the beam 22, adjacent the left-hand supporting member 10 (FIG. 1), is of similar construction, comprising cam members 52, 52 urged downwards by a spring 58 and being mounted for sliding movement in slides 28, 28 supported in the member 10.

Three sprocket wheels 30, 32 and 34 (FIGS. 1 and 26) are mounted on the supporting member 8 and a continuous chain 36 passes around them. At the other or left-hand side of the machine, three similar sprocket wheels 38, 40 and 42 are mounted on the supporting member 10 and these have a chain 44 passing around them. The chains 36, 44 have enlarged cam links 46, 48, respectively. In the at-rest condition of the machine (FIG. 26), the chains 36, 44 are in a position where the links 46, 48 are adjacent the sprocket wheels 30, 38, respectively, and the beam 22 is supported in an upper position by the cam members 50, 52 at opposite ends of the beam, which members rest on the links 46, 48, respectively, in the same manner as shown in FIG. 7. It is to be here noted that the machine as illustrated in both FIGS. 1 and 2 represents an intermediate phase of machine operation wherein the beam for compressing the bundle has already been dropped upon the bundle and the twine is in process of being wrapped around the bundle. However, when the machine is in its at-rest position and is ready to receive a bundle to be wrapped, the beam 22 is supported at an elevation well above the upper extent of the bundle, so that an operator may readily place the bundle to be wrapped upon the work table 4. The mechanism for supporting the beam in its at-rest position, for releasing the beam to free fall after treadling the machine, and for subsequently restoring the beam to its elevated or at-rest position will now be described with particular reference to FIGS. 1 and 4 through 7. Upon treadling of the machine the chains 36 and 44 are caused to move in a clockwise and an anticlockwise direction respectively, as viewed in FIG. 1. This movement of the chains causes the cam links 46, 48 to be carried up and outward away from their supporting positions under the cam members 50, 52 respectively, whereupon the beam is thus allowed to drop, under the force of gravity to compress the bundle B upon the work table 4. During the subsequent phases of the machine cycle, further movement of the chains 36, 44 carries the links 46, 48 downwards and brings them again under the cam members 50, 52 (FIG. 6). Thus, after twine has been carried around the bundle B, the links 46, 48 are again in a position to engage the members 50, 52, respectively, so that their then upward direction of movement (FIG. 7) carries the beam 22 up again into its elevated or at-rest position. At the end of the entire machine cycle, the chains 36, 44 come to rest at a position wherein the beam 22 is supported in its elevated or at-rest position. At any time when the beam 22 is supported by the cam members 50, 52 resting on the cam links 46, 48, the member 122 is held in a position wherein the gripping member 124 does not engage the guide rod 119, and thus the beam 22 is free to move up and down along the guide rods 119 (FIG. 7). However, when the beam 22 is not so supported by the cam links 46, 48 (FIG. 6), each member 122 is urged about its pivot 120 by the springs 56, so that the gripping member 124 engages the shaft 119, in monkey bite fashion, to prevent upward movement of the beam 22. It is to be noted that the construction at both ends of the beam 22 is similar and that, therefore, the beam 22 can freely move up and down in the slides 26, 28 when supported by the cam links 46 and 48, but can only move downward when not so supported. The beam 22 is thus prevented from bouncing upward after it has been allowed to drop downward upon the bundle B.

The twine T, which is to be applied to the bundle B, is supplied from a large reel 60, from whence it is fed through tensioning and slack take-up mechanism, to be described hereinafter, to a gripping and tensioning arm 142 (FIGS. 8 and 9), and thence to a first gripper 62, the operation of which will be described in more detail later. The twine-applying mechanism comprises the flyer 24 which is mounted on a chain 64 (FIGS. 8, 9 and 10). The chain 64 is continuous and passes over four sprockets 66. each similarly mounted at one corner of a rectangle in the inner head frame 14, FIG. 1. Since the path of the flyer, on rotation of the chain 64, forms a rectangle the lower side of which passes just under the level of the work table 4, the bundle B on the work table 4 is thus encircled by the chain 64. The flyer 24 comprises a block 128 (FIGS. 8, 9 and 10) fixed to one side of the chain 64 and a second block 132 fixed to the other side of the chain. A twine-engaging hook 126 is mounted on the block 128 and is normally latched into position, as shown in FIGS. 9 and 10, by a torsion spring 130. The block 132 comprises a downwardly extending portion to which is pivoted a twine gripping pawl 134, which is urged by a spring 136 against a surface 138 (FIG. 10) of the block 132 and, in the operation of the flyer 24 to carry twine around the bundle, twine is gripped between the pawl 134 and the surface 138. In each bundle tying cycle of the machine the flyer 24 on the chain 64 passes twice completely around the bundle B on the work table 4. In the at-rest position of the machine, as already described, the end of the twine passes through guide eyes 139 associated with a gripping head 140 on the tensioning arm 142, and then to the first gripper 62 which is in closed condition to grip the end of twine, as illustrated in FIG. 8. The tensioning arm 142 is pivotally mounted on the machine frame and, at the opposite side of the pivot from the gripping head 140, the arm 142 carries a cam roll 143 which is urged by a spring 145 against a cam 147 fixed on a cam shaft 166. When the tensioning arm 142 is in its at-rest position, the gripping head 140 is in contact with a cam surface 144 fixed below the table 44 and this cam surface releases the gripping action of the head 140, so that twine can be drawn through the head quite freely. When the twine wrapping operation of the machine commences, the flyer 24 is moved from its at-rest position until it arrives at a position between the tensioning arm 142 and the first gripper 62 which at the time is holding the end of the twine, in a taut condition, transverse to the path of the flyer 24. At this position of the flyer the strand of twine extending from the head 140 to the gripper 62 is engaged in the flyer hook 126 and a cam surface 146 on the gripper 62 engages a tail of the pawl 134 and moves the pawl out of engagement with the surface 138; thereafter, the twine is then positioned between the pawl 134 and the surface 138 and, as the flyer moves past the gripper 62, the pawl 134 moves out of engagement with the cam surface 146 and, under the action of the spring 136 grips the twine against the surface 138. Shortly after the flyer 24 has so moved past the gripper 62, the said gripper is operated, as will hereinafter be described, to release the twine (see FIG. 9), and the flyer 24, now gripping the twine, draws it out through the head 140 of the tensioning arm 142 and carries it around the bundle B. When the flyer 24 has passed around the bundle B and is again moving under the bundle B past the joint-forming mechanism, it meets a second gripper 68 which takes the twine from the flyer 24 and grips it. The flyer then continues to move around the bundle B for a second time, in an idle circuit, since it is no longer engaged with the end of the twine, and comes to rest again in the position it occupies in the at-rest condition of the machine, i.e., at about the point R in FIGS. 1 and 2. During this idle circuit of the flier 24, the jointure-forming mechanism, as will later be described, operates first to tension the twine around the bundle, to form a jointure in the twine by twisting a length of wire around overlapping end portions of the twine, to sever the twine that has been wrapped around the bundle from the remaining twine supply, and to eject the completed jointure from the joint forming mechanism so that the bundle may be removed from the machine.

The construction of the first gripper 62 will now be described with particular reference to FIGS. 8, 9, 11 and 14A, wherein the gripper 62 comprises an arm 148 pivoted on a first supporting shaft 80 which is mounted in the machine frame. Two parallel, but spaced apart, fixed jaws 150 are fixed to the upper end of the arm 148, and the cam surface 146 is formed on a block 152 also secured to the arm 148. Toward its lower end, the arm 148 is connected to a link 154 which is in turn connected to a cam lever 156 pivoted on a shaft 158. A cam roll 160, mounted on the lever 156, is urged against a cam 162 by the action of a spring 164. The cam 162 is fixed to the main cam shaft 166 of the machine. It can be seen from FIG. 8 that the cam 162 controls movement of the gripper 62 backwards and forwards in the operation of the machine.

The first gripper 62 also has a movable jaw 168 (FIGS. 8 and 9), pivoted, between the spaced fixed jaws 150, at 170. This movable jaw 168 is connected to a link 172 which extends downwards to a cam lever 174. The lever 174 is pivoted on the shaft 158 and carries a cam roll 176 which is urged against a cam 94 by a spring 180; the cam 94 being fixed on a control shaft 78. It can be seen from FIG. 8 that rotation of the cam 94 causes the jaw 168 to move towards and away from the jaws 150, thus to grip and release the twine. The first gripper 62 also comprises a twine severing blade that is mounted adjacent one of the jaws 150 (see FIGS. 8 and 14A). This blade is pivoted on the pivot 170 and comprises a downwardly extending arm 322, having a slot 324 formed therein. A pin secured to a triangular plate 326 lies in the slot 324. The plate 326 is pivoted to the arm 148 at 328, and is urged clockwise about this pivot by a spring 330 (viewing FIG. 8). The plate 326 comprises a lug 332, and it will be understood from FIGS. 8 and 14A that depression of this lug 332 will cause the plate 326 to move about its pivot 328, thus causing movement of the arm 322 and thus a cutting movement of the blade. Depression of the lug 332 is caused in the operation of the illustrated machine by a cam arm 333 (FIG. 14A) which moves forward under the action of a cam (not shown) on the main shaft 166.

Figure 15:
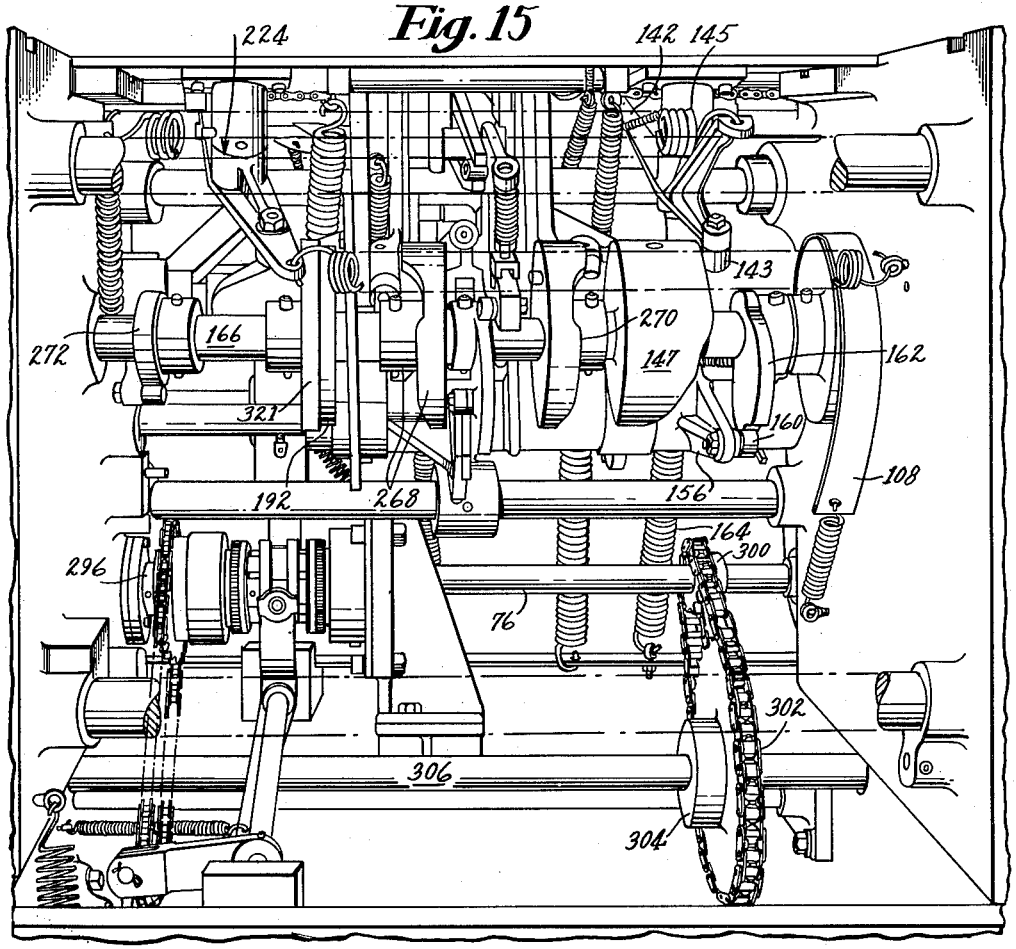
FIG. 15 shows a general perspective, front view, of the operating mechanism.

The construction of the second gripper 68 will now be described with particular reference to FIGS. 11 through 14B. The function of this second gripper is to intercept the leading end of the twine, after the bundle has been completely wrapped, and to retrieve it from the grasp of the flyer 24, thus permitting the flyer to continue its travel without carrying the twine. The second gripper 68 comprises a block 182 mounted on one end of a lever 184 pivoted on a second supporting shaft 82. The other end of the lever 184 is connected by a link 186 to one end of a cam lever 188 which is pivoted on the shaft 158. The other end of the lever 188 carries a cam roll 190 which is urged against a cam 192 by a spring 194. The cam 192 is fixed to the main cam shaft 166. It will be seen that the rotation of the cam shaft 166 causes the second gripper 68 to move backwards and forwards in the machine between the position shown as dotted lines in FIG. 12 and the position shown in full lines. Affixed to the block 182 is a stationary cam 196. Also fixed in the block is an upwardly extending plate 198 having a projection 200 (FIG. 11) which provides a fixed jaw 204. Pivoted on the projection 200 is a movable jaw 208 (FIGS. 14 and 14A) which comprises two members 202, 202 (FIG. 11) mounted on either side of the projection 200. A spring 210 urges the movable jaw 208 clockwise, as viewed in FIG. 14, into engagement with the fixed jaw 204. Affixed between the members 202, 202, of the movable jaw 208, is a catch plate 212. Pivoted in the block 182 at 214 is a latch 216 which is urged anticlockwise, as viewed in FIG. 14, by a spring 218. In the at-rest condition of the machine, the second gripper 68 is cocked, i.e. the jaw 208 is opened and away from the fixed jaw 204, and is held opened by engagement of the latch 216 with the catch plate 212. When the twine carrying flyer 24 has, as above described, moved once around the bundle, the gripper 68 is caused by the cam 192 to move into the position shown in FIG. 12. The flyer 24 then moves past the gripper 68 and, as it does so, the twine extending between the hook 126 (FIG. 14B) and the pawl 134 in the flyer 24 moves between the fixed jaw 204 and the movable jaw 208. This entry of the twine into the jaws of the second gripper pushes the latch 216 out of engagement with the catch plate 212. The movable jaw 208 then closes on the twine, under the action of the spring 210, and grips it. Just after this, the tail of the pawl 138 engages the stationary cam 196 thus causing rotary movement of the pawl against the force of the spring 136, thereby to release the twine (see FIG. 13). At the same time, a part of the jaw 204 engages a releasable latch, which normally holds the flyer hook 126 in its usual position, the hook then turns about a pivot until the twine is dropped, and then returns to its usual position under the action of the spring 130. The flyer 24 having now released the twine goes on to complete its idle circuit. Later, in the operation of the machine, the second gripper 68 is again cocked, i.e., the jaws are moved open and latched open by means of a cam arm 92 (FIGS. 11 and 14A) which contacts the under side of the right-hand end of the movable jaw 208 and causes it to move anticlockwise into an open position where it is latched. The cam arm 92 is operated by a cam 272 (FIG. 15) on the main cam shaft 166.

Figure 16:
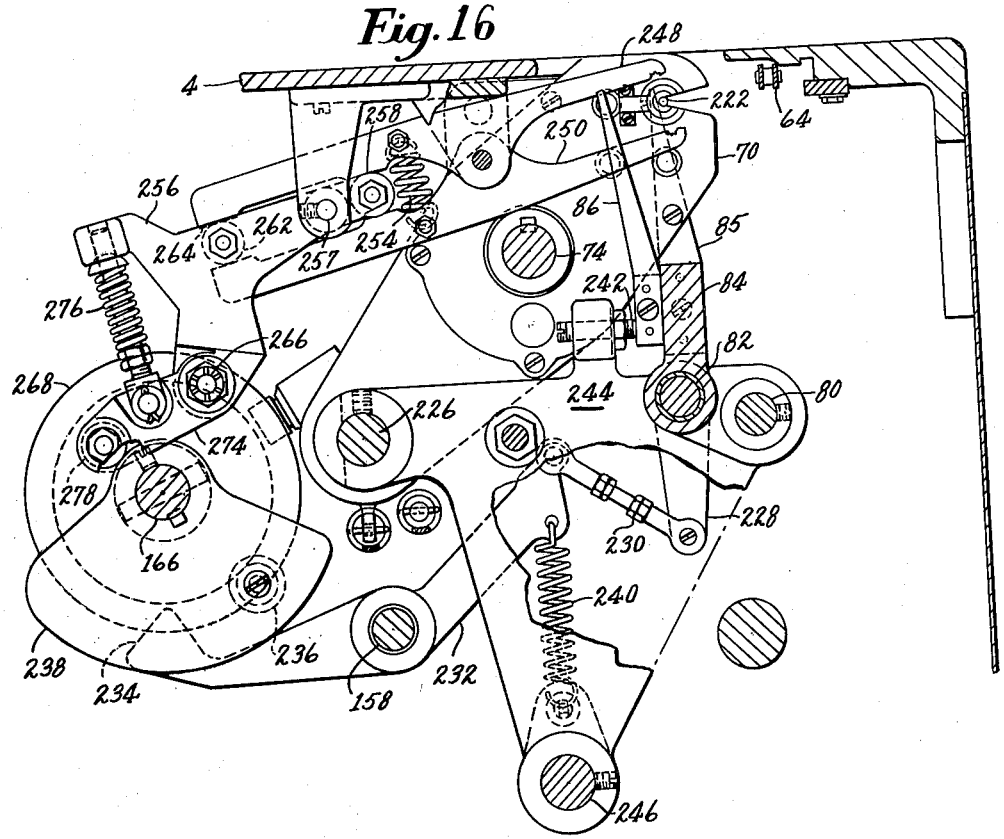
FIGS. 16 and 17 show details of the jointure forming mechanism.
Figure 17:
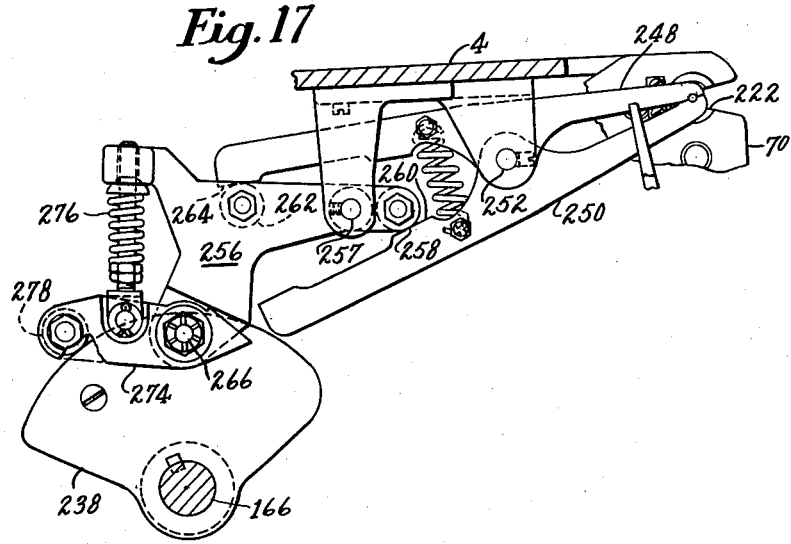

The jointure forming mechanism will now be described with particular reference to FIGS. 16 and 17. As previously stated, this mechanism closely resembles the mechanism described in our United States Patent No. 2,765,003, to which reference should be made for a complete description of any parts not described hereinafter in detail. Therefore, in order to facilitate the comparison of the disclosure of said patent with the structure of the present machine mechanism about to be described, corresponding parts of the machine described in the patent will be designated by reference characters that are hereinafter underscored. The jointure forming mechanism comprises two wire applying spindles 222 (designated in the patent as 14 and 15) which are mounted for rotary movement in carriers 70, 72 (48 and 58). Wire is supplied to these spindles by a wire feeding device 224 (FIG. 15) (similar to that shown at 76). It will be realized also that the twine tensioning arm 142 corresponds generally to the block 117 and the second gripper 68 to the twine clamp 98. The machine of the present invention comprises a stationary shaft 226 (corresponding to the shaft 26), the main cam shaft 166 (corresponding to the shaft 27), and an oscillating shaft 74 (corresponding to the shaft 28). The machine also comprises a driving shaft 76 (FIG. 11) as well as various tie shafts shown in the drawings and not identified therein. The carriers 70, 72 are caused to move toward and away from each other by cams 268 and 270 (FIG. 15) (68 and 70) fixed on the main cam shaft 166, and the oscillating shaft 74 causes the spindles 222 to rotate in the same manner as described in our above-mentioned patent. The oscillating shaft 74 is caused to move by mechanism similar to that shown in FIGS. 14, 15 and 16 of said patent.

The means for ejecting a completely formed jointure from the spindles 222 will now be described with particular reference to FIGS. 11 and 16. Pivoted on the shaft 82 is an ejector block 84 which has fixed to it two outer ejector arms 85 which lie outside the carriers 70 and 72, and two inner ejector arms 86 which lie between the carriers 70 and 72. An arm 228 extends downwardly from the block 84 and is connected by a link 230 to one end of a cam lever 232 that is pivoted on the shaft 158. At its other end the cam lever 232 bears a lug 234 which is arranged to be operated upon by a cam lug 236 fixed to a cam 238 which is fixed on the main cam shaft 166. A spring 240 acts on the lever 232 and serves to urge the ejector block 84 against a stop 242 which is adjustably mounted on a tie member 244 mounted on the three shafts 80, 82, 226 and a tie shaft 246. It can thus be seen that the ejector arms 84, 85 are usually in a position as shown in FIG. 16, but that rotation of the shaft 166, so that the lug 236 contacts the lug 234, causes the ejector arms 85, 86 to move to the right (viewing FIG. 16), and then allows them to return to their original position under the action of the spring 240.

Referring again to FIGS. 16 and 17, the machine also comprises a wire tie gripper having upper and lower gripper arms 248, 250 (corresponding to the arms 85 and 86 of our patent). These gripper arms 248, 250 are pivoted to the under side of the work table 4 at 252. Forward ends of the gripper arms 248 and 250 are positioned between the spindle carriers 70, 72, and a spring 254 acts between the arms to urge the jaws, or forward ends, away from each other. A cam arm 256 pivoted at 257 carries a roll 258 adapted to bear against a surface 260 of the arm 250 and a roll 262 is adapted to bear against a surface 264 of the arm 248. Pivoted at 266 on the cam arm 256 is a second cam arm 274. A spring 276 acts upon the cam arm 274 and the arm 256, and, as can be seen from FIGS. 16 and 17, the arm 274 is capable of limited movement against the spring 276 relative to the arm 256. A cam roll 278 is mounted on the arm 274 and bears against the cam 238. It can thus be seen from FIGS. 16 and 17 that rotation of the cam 238 by the shaft 166 causes the forward ends of the wire tie gripper arms to move toward and away from each other. It can also be seen that when the forward ends are together they may be moved apart against the action of the spring 276.

Referring to FIGS. 11 and 14A, it is to be noted that the machine is also provided with a twine deflecting arm 88 which is pivoted on the shaft 82. This arm 88 is urged toward the front of the machine by a spring 280, but is held toward the rear of the machine during most of the machine cycle by a cam 90 fixed to the shaft 78. As will be described later in more detail, the deflecting arm 88 is provided with a twine engaging hook at its upper end, so that when the arm is moved toward the front of the machine it contacts and displaces the twine a sufficient amount to locate and hold the twine in line with the axis of rotation of the spindle 222.

Affixed to the control shaft 78 are a dog cam 96 (FIG. 11) and a clutch control cam 98 (FIGS. 18 and 19). An actuating lever 282 is pivoted at 284 and carries at one end a cam roll 286 urged against the cam 98 by a spring 288. The other end of the lever 282 is arranged to actuate a single revolution clutch 290 which, when actuated, serves to couple the main cam shaft 166 to a sprocket 292 which is driven, through a chain 294, by the motor 2. The dog cam 96 (FIG. 11) has a pivoted arm 100 urged against it by a spring 102. This arm 100 is arranged so that, when moved, it actuates a primary clutch 104, which, when actuated, couples the drive shaft 76 to a sprocket 296 which is driven through a chain 109 connected with the motor 2. Gearing 106 interconnects the driving shaft 76 and the control shaft 78, and a band brake 108 acts on the control shaft 78. A sprocket 300 (FIG. 15) is fixed to the shaft 76 and, through a chain 302, is connected to a sprocket 304 fixed to a shaft 306. The shaft 306 has a bevel gear fixed at each of its ends, one of which gears, 308, is shown in FIG. 5. The gear 308 engages another bevel gear 310 which is fixed to a shaft 312 to which a sprocket 314 is also fixed. A chain 316 passes around the sprocket 314 and also around a sprocket 318 which is fixed to a shaft 320 to which the sprocket 34 is also fixed. Thus, rotation of the shaft 306 causes movement of the chain 36, and it also causes movement of the chain 44 by means of mechanism similar to that shown in FIG. 5 and situated at the opposite side of the machine.

Figure 15A:
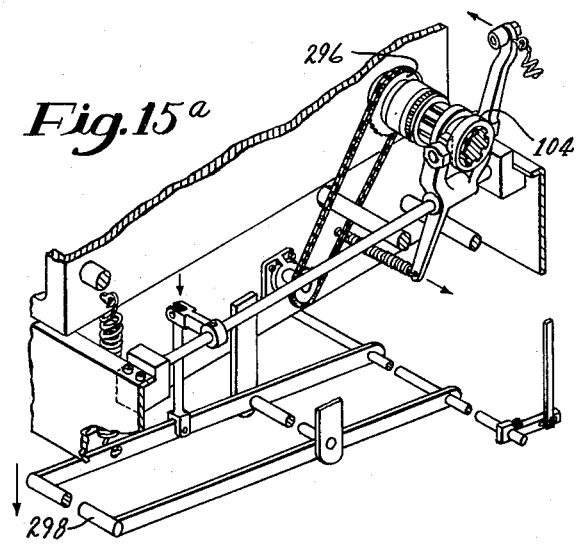
FIG. 15A is a perspective view of the treadle and clutch mechanism.

When the bundle tying machine is to be used, the motor 2 is set in motion. The machine is then tripped by the operation of a treadle 298 (FIG. 15A) and the pivoted arm 100 is moved about its pivot out of engagement with a recess in the dog cam 96. At the same time the control shaft 78 is released for rotation and the primary clutch 104 is actuated so that the motor 2 then serves to drive the shaft 76 through the chain 109 (FIGS. 2 and 11). Rotation of the shaft 76 causes, through a gear box 110, rotation of a sprocket 112 which drives another sprocket 114 by means of a chain 116. The sprocket 114 is fixed to a shaft to which one of the flyer chain sprockets 66 is also fixed; thus the flyer chain 64 is caused to move in a clockwise direction (viewing FIG. 1) around its rectangular path; the flyer 24 thus carrying the twine T around the bundle B. Shortly before the flyer 24 completes its first circuit of the bundle B, rotation of the control shaft 78 causes the clutch control cam 98 to trip the single revolution clutch 290 thereby to couple the main cam shaft 166 to the motor 2 and cause the shaft 166 to perform one revolution. As will be explained hereinafter, this revolution of the main cam shaft causes the operation of the twine jointure forming mechanism. While this mechanism is operating, the flyer 24 performs its second, or idle circuit. When the control shaft 78 rotates to bring the recess in the cam 96 around to the arm 100, the arm 100 is pulled into said recess by the spring 102; the clutch 104 is disengaged, and rotation of the shafts 76 and 78 stops. Movement of the flyer 24 consequently ceases, but the twine jointure forming mechanism continues to operate until the single revolution clutch 290 trips itself out after one revolution of the main cam shaft 166. The band brake 108, and the recess in the dog cam 96 insure that the shaft 78 always comes to rest in the same position at the end of each machine cycle.

One complete cycle of operation of the machine will now be described.

In the at-rest condition of the machine, the presser beam 22 is being held in its upper position; the flyer 24 is approximately at R; and twine extends from the supply reel 60 to the twine gripping head 140 on the tensioning arm 142, and thence to the first gripper 62. The wire applying spindles 222 are situated with their radial side openings, alined and adapted to receive twine, facing towards the rear of the machine; the ejector arms 85 and 86 are towards the front of the machine; the second gripper 68 is in a cocked condition and towards the rear of the machine and the twine deflecting arm 88 is also towards the rear of the machine.

On the machine being tripped, the shafts 76 and 78 begin to rotate. The flyer 24 then begins to move and picks up the twine from between the head 140 of the tensioning arm 142 and the first gripper 62. The flyer then carries the twine underneath the bundle, the gripper 62 releasing the twine under the action of the cam 94 on the control shaft. Rotation of the driving shaft 76 also causes rotation of the shaft 306, which causes the chains 36 and 44 to move so that the cam links 46 and 48 are carried out of supporting engagement with the beam 22, and the beam is dropped onto the bundle B thus compressing it. The flyer 24 carries twine around the bundle, and by the time the flyer 24 is traveling down the left-hand part of its path (viewed in FIG. 2) the shaft 78 has rotated so that the clutch control cam 98 operates the single revolution clutch 290, and the main cam shaft 166 is caused to rotate. Rotation of the main cam shaft 166 causes the cam 192 to operate the second gripper 68 from its position towards the rear of the machine into the path of the flyer 24, and also causes the cams 268 and 270 to rotate and thus the spindle carriers 70 and 72 to move towards one another. Before the flyer 24 reaches the first gripper 62, this gripper 62 is moved towards the rear of the machine out of the path of the flyer 24. It will be understood that if the gripper 62 were in the path of the flyer, when it passes the gripper 62 for the second time, the cam surface 146 would operate on the tail of the pawl 134 and cause the flyer 24 to drop the twine. The flyer 24 now carries the twine past both spindles 222. As it does so, the twine deflecting arm 88 moves sharply towards the front of the machine and presses the twine into the openings of the spindles 222 where it overlaps twine already positioned therein by the earlier passage of the flyer 24 (FIG. 14A). Just after the flyer 24 passes the two spindles it engages the second gripper 68 as previously described, the twine contacting the latch 216, the gripper 68 gripping the twine, and the camming action of the stationary cam 196 and the projection 200 causing the flyer 24 to drop the twine. The flyer now moves on to complete its idle circuit. At about this time wire is fed from the wire feeding device 224 into the spindles 222 by the action of a cam 321 (FIG. 15) on the main cam shaft 166. The wire feeding device 224 having advanced the desired length of wire strand into the spindles, the said wire is then sheared off by a shearing device adjacent the carrier 70. The second gripper 68 now moves towards the front of the machine under the action of the cam 192 to carry the end of the twine into axial alinement with the spindles 222. At the same time the tensioning arm 142 is moved towards the right under the action of spring 145 (FIG. 15), gripping the twine as the head 140 moves away from the cam surface 144 and thus tightening the twine around the bundle B. When the twine is tight, the first gripper 62 moves towards the front of the machine again to grip the twine. At about this time, depending on the size of the bundle B, the cam links 46 and 48 are brought into contact with the cam members 50 and 52 to return the beam 22 to its upper or at-rest position. At this stage in the cycle of machine operation, two overlapping portions of twine lie in the rearwardly facing openings of the spindles 222. The spindles now operate, to form a jointure between these two portions of the twine. substantially in the manner shown in FIGS. 18, 19, 20 and 21 of our Patent No. 2,765,003; the spindles turning in opposite directions to twist wire around the twine while moving apart. As the spindles move apart the wire gripping arms 248, 250 move together between the spindles tightly to grip the jointure about its mid point. When the wire jointure has been formed, the first gripper 62 again grips the twine, under the action of the cam 94, and the twine severing means mounted on the gripper 62 is operated (as previously described) to sever the twine between the gripper 62 and the jointure. The primary clutch 104 is disengaged, the flyer 24 being back in its at-rest position R. The main cam shaft 166 continues to rotate, and causes the second gripper 68 to release the twine, by operation of the cam arm 92. Then the gripper 68 returns to its at-rest position at the rear of the machine. The jointure having been completed, the spindles 222 come to rest apart from one another with their openings once more facing toward the rear of the machine; the wire gripping arms 248, 250 release the wire tie, and the ejector block 84 is moved to bring the ejector blades 85, 86 towards the rear of the machine to eject the completed jointure from the spindles 222. The various mechanisms of the machine are now all returned to their at-rest positions, and the secondary clutch 290 disengages itself, whereupon the cycle of operation is completed.

When the bundle B is being encircled by the twine, the twine moves across the surface of the bundle and curves around the corners of the bundle. In order to prevent undesirable damage to the bundle, especially at the edges thereof, the machine is provided with bundle edge guard rolls, two of which are mounted below the work table 4; and two in the beam 22, which, when the beam is dropped on the bundle, are disposed so that one roll will be adjacent each corner of the bundle over which the twine will pass. When the machine is set into operation, the flyer 24 carries the twine T around the bundle B, but the twine is held away from the bundle by the said four guard rolls. When the encircling of the bundle is completed, and before the operation of the tensioning arm 142 commences to tighten the twine about the bundle, the guard rolls are moved out of engagement with the twine so that the twine is then allowed to engage the bundle. Referring to FIGS. 1, 2, 20 and 21, wherein the features of the aforementioned twine engaging guard rolls are illustrated, a pair of upper guard rolls 334 and 336 are supported in the beam 22, and a pair of lower guard rolls 338 and 340 are mounted below the table 4. Fixed to the shaft 80 are two upwardly extending arms 342, 344 (FIG. 2) towards the upper ends of which the rolls 338, 340, respectively, are freely mounted. A cam arm 346 is also fixed to the shaft 80 and a cam roll 350 mounted on this arm bears against a cam 348 fixed on the shaft 78 (see FIGS. 20 and 21). A spring 352 acts to urge the roll 350 against the cam 348. Mounted in the beam 22 is a shaft 354 to which are fixed two supports 356, 358 (FIG. 1) on which are mounted the rolls 334, 336, respectively. Fixed to one end of the shaft 354 is a crank arm 360 (FIGS. 2 and 22) to which is pivoted the upper end of a vertical shaft 362. An upwardly extending rod 364 is fixed to the crank arm 360 and passes through a lug 366 on the beam 22. A spring 368 acts between the lug 366 and a collar 370 on the rod 364 to urge the rod 364 and the shaft 362 downwards. The shaft 362 is slidably mounted for vertical movement in the frame of the machine, and has mounted on it toward its lower end a gripper 372 (FIGS. 22–25). A spring 374 acts between the frame of the machine and the gripper 372 to urge the gripper 372 downwards. The gripper 372 is mounted on one end of a cam lever 376 which is pivoted at 378 (FIG. 25) and which carries a cam roll 380 urged against a cam 382 by a spring 383; the cam 382 being fixed to the shaft 78. In operation, when the beam 22 is dropped onto the bundle, the flyer carries the twine around the bundle while the guard rolls are in position to support the twine. As previously described, before the twine tensioning arm 142 operates to pull the twine tight around the bundle, the guard rolls are moved out from contact with the twine thus allowing the twine to be tensioned into direct contact with the bundle. The lower rolls 338 and 340 are moved by the action of the cam 348 which causes, through the cam arm 346, rotation of the shaft 80 (see FIG. 20). In the case of the upper rolls 334 and 336, at the requisite moment the cam 382 causes the gripper 372 to move upwards, gripping the shaft 362 and thus, through the crank arm 360, causing rotation of the shaft 354, to bring the rolls 334 and 336 out from under the twine. It will be realized that the construction of the gripper element 372 is such that, when it is in the position shown in FIG. 25, the shaft 362 can slide freely through it so that the fall of the beam 22 is not impeded; but that when the gripper 372 is moved into the position shown in FIG. 23 it grips the shaft 362 and moves it upwards. After the twine has been allowed to contact the bundle, the four guard rolls are returned to their at-rest position; the upper rolls 334 and 336 by the action of the spring 368; and the lower rolls 338, 340 by the action of the spring 352. It will also be realized that the positions of the guard rolls can readily be adjusted laterally, to render the machine suitable to deal with bundles of varying sizes, by manually sliding the arms 342 and 344 to different positions on the shaft 80, and by similarly adjusting the positions of the supports 356 and 358 on the shaft 354.

Another feature of the machine is the provision of means for causing the beam 22 to exert a positive pressure on the bundle B after the beam has been dropped. The mechanism for positively compressing the bundle, by applying a downward force to the beam, will now be described with reference to FIGS. 26 and 27; it will be understood that, although only the mechanism at the right-hand side of the machine is illustrated in detail, this mechanism is duplicated at each end of the beam 22. The guide rod 119 is slidably mounted in the vertical supporting member 8, and is secured to a bracket 384 which is slidably mounted on rods 386 and 388 of the member 8. A downwardly extending rod 390 is fixed to the bracket 384 and supports, at its lower end, a piston 392 mounted in a cylinder 394 having a closed upper end 396. A spring 398 acts between the end 396 and the piston 392. A rod 400, secured to the lower end of the cylinder 394, is connected to a crank 402 which, in the operation of the machine, is caused to rotate, thus to move the rod 400 up and down. In the operation of the machine and after the beam 22 has been dropped onto the bundle in the manner previously described, the crank 402 is moved from the position of FIG. 26 into the position shown in FIG. 27, thus positively drawing down the rod 400 and, through the spring 398, exerting a yieldable downward force upon both the rod 390 and the guide rod 119. The guide rod 119, at this stage, is gripped by the gripping member 124 (see FIG. 6), and thus the beam 22 is also pulled down; the pressure thus exerted being dependent on the strength of the spring 398 and of the corresponding spring at the left-hand side of the machine. It will thus be seen that the compacting force that may be applied is independent of the size of the bundle.

Having thus described our invention, what we claim as new and desire to secure by Letters Patent of the United States is:

1. A machine for tying bundles by encrcling a bundle with a length of twine the overlapped portions of which are then secured by applying a jointure while the length of twine is tensioned around the bundle, comprising: a twine carrying flyer member rotatable in one direction twice around the bundle during each tying operation; clamping means carried by said flyer for engaging an end of twine to pull the twine around the bundle during the twine wrapping operation; a first gripper for holding said end of twine during the at-rest condition of the machine and for delivering the twine end to said clamping means on the flyer to initiate the twine wrapping operation; means positioned in the rotative path of the flyer for releasing said clamping means and for transferring the twine end to the clamping action of a second gripper after the twine end has been carried once completely around the bundle; means, including said second gripper and a movable twine gripping head, for increasing the tension on the twine and for maintaining the twine under tension and in overrlapped relation; and means for forming a jointure at the overlapped portions of the twine.

2. A machine for tying bundles by encircling a bundle with a length of twine the overlapped portions of which are then secured by applying a jointure while the length of twine is tensioned around the bundle, comprising: a twine carrying flyer member rotatable in one direction twice around the bundle during each tying operation; clamping means carried by said flyer for engaging an end of twine to pull the twine around the bundle during the twine wrapping operation; a first gripper for holding said end of twine during the at-rest condition of the machine and for delivering the twine end to said clamping means on the flyer to initiate the twine wrapping operation; means positioned in the rotative path of the flyer for releasing said clamping means and for transferring the twine end to the clamping action of a second gripper after the twine end has been carried once completely around the bundle; means, including said second gripper and a movable twine gripping head, for increasing the tension on the twine and for maintaining the twine under tension and in overlapped relation; means for forming a jointure at the overlapped portions of the twine; and cutting means adjacent the first gripper for severing the twine after said gripper has again taken hold of the twine.

3. A machine for tying bundles by encircling a bundle having four corners with a length of twine the overlapped portions of which are then secured by applying a jointure while the length of twine is tensioned around the bundle, comprising: a twine carrying flyer member rotatable in one direction twice around the bundle during each tying operation; clamping means carried by said flyer for engaging an end of twine to pull the twine around the bundle during the twine wrapping operation; a series of twine supporting guard rolls normally disposed adjacently spaced apart from the four corners of the bundle and in the path of the twine; a first gripper for holding said end of twine during the at-rest condition of the machine and for delivering the twine end to said clamping means on the flyer to initiate the twine wrapping operation; means for retracting said guard rolls away from the twine when the bundle has been encircled; means positioned in the rotative path of the flyer for releasing said clamping means and for transferring the twine end to the clamping action of a second gripper after the twine end has been carried once completely around the bundle, means, including said second gripper and a movable twine gripping head, for increasing the tension on the twine and for maintaining the twine under tension and in overlapped relation; and means for forming a jointure at the overlapped portions of the twine.

4. A machine for tying bundles by encircling a bundle with a length of twine the overlapped portions of which are then secured by applying a jointure while the length of twine is tensioned around the bundle, comprising: a twine carrying flyer member rotatable in one direction twice around the bundle during each tying operation; clamping means carried by said flyer for engaging an end of twine to pull the twine around the bundle during the twine encircling operation; a first gripper for holding said end of twine during the at-rest condition of the machine and for delivering the twine end to said clamping means on the flyer to initiate the twine wrapping operation; means for releasing said clamping means and for transferring the twine end to the clamping action of a second gripper after the twine end has been carried once completely around the bundle; means. including said second gripper and a movable twine gripping head, for increasing the tension on the twine and for maintaining the twine under tension and in overlapped relation; means for forming a jointure at the overlapped portions of the twine; cutting means adjacent the first gripper for severing the twine after said gripper has again taken hold of the twine; and means for releasing the twine end from the clamping action of the second gripper in order to permit the removal of the completely tied bundle from the machine.

5. A machine for tying bundles by encircling a bundle with a length of twine the overlapped portions of which are then secured together by applying a jointure while the length of twine is tensioned around the bundle, comprising: a work table for supporting a bundle; mechanism for forming a jointure in the twine beneath the table; a head frame extending above the table and provided with an opening within which the bundle may be positioned; a twine carrying flyer member operatively driven in a closed path around the opening, the twine carrying flyer member having a releasable clamp for engaging an end of the twine to be carried around the bundle until two overlapped portions are disposed beneath the bundle; a first gripper member operatively located beneath the table and to one side of the jointure forming mechanism, said gripper member being adapted, in the at-rest position of the machine, to hold an end of twine in the path of the flyer and to deliver said end to the flyer clamp as the flyer moves past said gripper; a second gripper member located at the other side of said jointure forming mechanism and operative to receive the end of twine from the flyer, after the flyer has carried the twine end completely around the bundle, and to clamp said twine end while the flyer continues to move for a second time around the bundle to an at-rest position adjacent the first gripper member; a twine deflector arm operative to move the overlapped portions of twine into operative engagement with the jointure forming mechanism; a twine tensioning clamp movable in a direction away from the second gripper and operable to tension the entire length of twine around the bundle; and means operative after the jointure has been formed, to bring the first gripper again into clamping engagement with the twine.

6. A machine for tying bundles by encircling a bundle with a length of twine the overlapped portions of which are then secured together by applying a jointure while the length of twine is tensioned around the bundle, comprising: a work table for supporting a bundle; mechanism for forming a jointure in the twine beneath the table; a head frame extending above the table and provided with an opening within which the bundle may be positioned; a series of sprocket rolls mounted in the head frame adjacent said opening; a continuous chain rotatably supported by the sprockets for operative movement in a closed path around the opening; a twine carrying flyer member affixed to the chain and having a releasable clamp for engaging an end of the twine to be carried around the bundle during rotation of the chain; a first gripper member operatively located beneath the table and to one side of the jointure forming mechanism, said gripper member being adapted, in the at-rest position of the machine, to hold an end of twine in the path of the flyer and to deliver said end to the flyer clamp as the flyer moves past said gripper; a second gripper member located at the other side of said jointure forming mechanism and operative to receive the end of twine from the clamp on the flyer, after the flyer has carried the twine completely around the bundle, and to clamp said twine end while the flyer continues to move for a second time around the bundle to an at-rest position adjacent the first gripper member; a twine deflector arm operative to move the overlapped portions of twine into operative engagement with the jointure forming mechanism; a twine tensioning clamp movable in a direction away from the second gripper and operable to tension the entire length of twine around the bundle; means, operative after the jointure has been formed, to bring the first gripper again into clamping engagement with the twine; and twine cutting means operative to sever the twine between the first gripper and the jointure forming mechanism.

7. A machine for tying bundles by encircling a bundle with a length of twine the overlapped portions of which are then secured together by applying a jointure while the length of twine is tensioned around the bundle, comprising: a work table for supporting a bundle; mechanism for forming a jointure in the twine beneath the table; a head frame extending above the table and provided with an opening within which the bundle may be positioned; a series of sprocket rolls mounted in the head frame adjacent said opening; a continuous chain rotatably supported by the sprockets for operative movement in a closed path around the opening; a twine carrying flyer member affixed to the chain and having a releasable clamp for engaging an end of the twine to be carried around the bundle during rotation of the chain; a first gripper member operatively located beneath the table and to one side of the jointure forming mechanism, said gripper member being adapted, in the at-rest position of the machine, to hold an end of twine in the path of the flyer and to deliver said end to the flyer clamp as the flyer moves past said gripper; a second gripper member located at the other side of said jointure forming mechanism and operative to receive the end of twine from the flyer clamp, after the flyer has carried the twine completely around the bundle, and to clamp said twine end while the flyer continues to move for a second time around the bundle to an at-rest position adjacent the first gripper member; a twine deflector arm operative to move the overlapped portions of twine into operative engagement with the jointure forming mechanism; a twine tensioning clamp movable in a direction away from the second gripper and operable to tension the entire length of twine around the bundle; means, operative after the jointure has been formed, to bring the first gripper again into clamping engagement with the twine; twine cutting means operative to sever the twine between the first gripper and the jointure forming mechanism; and ejector means operative to remove the overlapped twine portions from engagement with the jointure forming mechanism.

8. A machine for tying bundles with a length of twine, comprising: a table upon which a bundle to be tied is supported; a twine-carrying flyer movable in a given direction under the bundle, then up the far side, across the top, down the near side and again under the bundle to encircle the bundle with a length of twine having overlapped portions beneath the bundle; jointure applying mechanism centrally disposed beneath the bundle and adjacent the position of said overlapped portions; a twine guideway through which an end of twine extends from a twine supply and may be pulled by the flyer in the given direction; a first gripper adjacent said guideway adapted, in the at-rest condition of the machine, to grip the end of twine and to hold it in the path of the oncoming flyer; twine transfer mechanism associated with said gripper for releasing the end of twine and for clamping it to the flyer; a second gripper, adjacent the far side of the bundle and normally out of the path of the oncoming flyer, but movable into said path as the twine carrying flyer passes under the bundle for the second time; a second transfer mechanism operative to transfer the end of twine from the flyer to the second gripper, whereupon the flyer continues alone to move about the bundle for a second time; and twine tensioning means, including said second gripper and a movable twine clamp adjacent the twine guideway, for tensioning the twine before the jointure is applied.

References Cited in the file of this patent
UNITED STATES PATENTS

| | | |
|---|---|---|
| 2,198,440 | Marchand | Apr. 23, 1940 |
| 2,608,150 | Cranston | Aug. 26, 1952 |
| 2,920,553 | Van Marle | Jan. 12, 1960 |

FOREIGN PATENTS

| | | |
|---|---|---|
| 534,653 | Great Britain | Mar. 13, 1941 |
| 742,546 | Great Britain | Dec. 30, 1955 |